(12) United States Patent
Nishida et al.

(10) Patent No.: US 9,335,643 B2
(45) Date of Patent: May 10, 2016

(54) PROCESS FOR PROCESSING SURFACE OF ELECTROPHOTOGRAPHIC PHOTOSENSITIVE MEMBER AND PROCESS FOR PRODUCING ELECTROPHOTOGRAPHIC PHOTOSENSITIVE MEMBER

(71) Applicant: CANON KABUSHIKI KAISHA, Tokyo (JP)

(72) Inventors: Tsutomu Nishida, Mishima (JP); Yasuhiro Kawai, Abiko (JP); Koji Takahashi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 372 days.

(21) Appl. No.: 13/839,640

(22) Filed: Mar. 15, 2013

(65) Prior Publication Data
US 2013/0270740 A1 Oct. 17, 2013

(30) Foreign Application Priority Data

Apr. 17, 2012 (JP) .................................. 2012-094053
Mar. 12, 2013 (JP) .................................. 2013-048993

(51) Int. Cl.
| | |
|---|---|
| *B29C 59/02* | (2006.01) |
| *G03G 5/00* | (2006.01) |
| *B29C 59/00* | (2006.01) |
| *G03G 5/04* | (2006.01) |
| *G03G 5/05* | (2006.01) |
| *G03G 5/147* | (2006.01) |

(52) U.S. Cl.
CPC ................ *G03G 5/00* (2013.01); *B29C 59/005* (2013.01); *B29C 59/02* (2013.01); *G03G 5/04* (2013.01); *G03G 5/0525* (2013.01); *G03G 5/147* (2013.01)

(58) Field of Classification Search
CPC .............................. B29C 59/005; B29C 59/02
See application file for complete search history.

(56) References Cited

U.S. PATENT DOCUMENTS

| 8,843,024 B2 * | 9/2014 | Uematsu et al. ............... 399/111 |
| 2007/0281239 A1 * | 12/2007 | Uematsu ................ G03G 5/043 430/133 |
| 2011/0135340 A1 | 6/2011 | Uematsu |

FOREIGN PATENT DOCUMENTS

| CN | 101765812 A | 6/2010 |
| EP | 2175321 A1 | 4/2010 |

(Continued)

*Primary Examiner* — Ryan Ochylski
(74) *Attorney, Agent, or Firm* — Canon USA, Inc. IP Division

(57) ABSTRACT

In the cross-section perpendicular to the axis of rotation of the electrophotographic photosensitive member, when an arc which is a line at the intersection of the cross-section with a contacting face (face where the electrophotographic photosensitive member and the molding member contact), is represented by an arc AB, the center of a circle of the cross-section of the electrophotographic photosensitive member is represented by a center O, and the point at the intersection of a straight line via the center O among straight lines of a direction of the pressure contact of the molding member with the arc AB is represented by an intersection C, the uneven structure on the surface of the molding member transfers to the surface of the electrophotographic photosensitive member so that ∠AOC and ∠BOC satisfy the following formulas (1) and (2), respectively:

$$0.5° \leq \angle AOC \leq 45°$$ (1), and $$0.5° \leq \angle BOC \leq 45°$$ (2).

7 Claims, 4 Drawing Sheets

(56) References Cited

FOREIGN PATENT DOCUMENTS

| | | |
|---|---|---|
| EP | 2278405 A1 | 1/2011 |
| JP | H04-059518 A | 2/1992 |
| JP | 3938209 B2 | 6/2007 |
| JP | 4059518 B2 | 3/2008 |
| JP | 2009-031419 A | 2/2009 |
| JP | 2011-022579 A | 2/2011 |

* cited by examiner

PROCESS FOR PROCESSING SURFACE OF ELECTROPHOTOGRAPHIC PHOTOSENSITIVE MEMBER AND PROCESS FOR PRODUCING ELECTROPHOTOGRAPHIC PHOTOSENSITIVE MEMBER

BACKGROUND OF THE INVENTION

1. Field of the Invention

The present disclosure relates to a process for processing the surface of an electrophotographic photosensitive member and a process for producing an electrophotographic photosensitive member.

2. Description of the Related Art

With respect to an electrophotographic photosensitive member containing an organic photoconductive substance (charge generating substance), there is a technique for compounding a curable resin in the surface layer of an electrophotographic photosensitive member for the purpose of increasing the durability (wear resistance and the like) of the electrophotographic photosensitive member.

However, due to an increase in the wear resistance of the electrophotographic photosensitive member, the cleaning performance is likely to be influenced and image flow is likely to occur. The influence on the cleaning performance includes problems, such as an increase in drive torque caused by an increase in the frictional force of the surface with high wear resistant of the electrophotographic photosensitive member and a cleaning blade, slipping of a toner due to minute vibration of the cleaning blade, and reversal of the cleaning blade. The image flow is a problem caused by a degradation of materials for use in the surface layer of the electrophotographic photosensitive member due to acidic gas, such as ozone and nitrogen oxide, produced by charging the electrophotographic photosensitive member and a reduction in the surface resistance of the electrophotographic photosensitive member caused by the formation of nitric acid from a part of acidic gas due to adsorption of moisture.

As techniques for solving the problems, Japanese Patent No. 3938209 discloses a technique for suppressing the image flow under a high temperature and high humidity environment by providing a plurality of concave portions in the surface of an electrophotographic photosensitive member with a high area ratio. However, in the technique for forming the concave portions described in Japanese Patent No. 3938209, the suppression of image flow under a high temperature and high humidity environment is insufficient, and thus the uneven structure needs to be finely controlled. Then, in order to further suppress image flow, there is a technique for transferring an uneven structure of a molding member onto the surface of an electrophotographic photosensitive member to thereby more finely control the uneven structure. Japanese Patent No. 4059518 discloses a technique for controlling the temperatures of a molding member and a support of an electrophotographic photosensitive member when transferring the uneven structure of the molding member onto the surface of the electrophotographic photosensitive member to thereby increase the shape reproducibility and further suppress image flow and further improve the cleaning performance.

However, the technique disclosed in Japanese Patent No. 4059518 has a problem such that the electrophotographic characteristics decrease by the concave portions formed on the surface of the electrophotographic photosensitive member, and therefore has room for improvement. As a result of an examination of the present inventors, it has been clarified that the reduction in the electrophotographic characteristics is likely to cause a reduction in the thin line reproducibility of high-resolution images.

SUMMARY OF THE INVENTION

The present disclosure provides a process for processing the surface of an electrophotographic photosensitive member with high thin line reproducibility and a process for producing the electrophotographic photosensitive member.

The purpose is achieved by the description provided below.

The embodiments disclosed herein relate to a process for processing the surface of an electrophotographic photosensitive member, which is a process for forming an uneven structure on a surface of a cylindrical electrophotographic photosensitive member having a resin layer, including the following processes of:

bringing a molding member having a surface structure corresponding to the uneven structure on a surface thereof into pressure contact with the electrophotographic photosensitive member at a contacting face, the molding member having an elastic layer, transferring the uneven structure on the surface of the molding member to the surface of the electrophotographic photosensitive member while rotating the electrophotographic photosensitive member, in which, in a cross-section to be perpendicular to the axis of rotation of the electrophotographic photosensitive member, when an arc which is a line at the intersection of the cross-section with the contacting face, is represented by an arc AB, the center of a circle of the cross-section of the electrophotographic photosensitive member is represented by a center O, and the point at the intersection of a straight line via the center O among straight lines of a direction of the pressure contact of the molding member with the arc AB is represented by an intersection C, the uneven structure on the surface of the molding member transfers to the surface of the electrophotographic photosensitive member so that $\angle AOC$ and $\angle BOC$ satisfy the following formulas (1) and (2), respectively:

$$0.5° \leq \angle AOC \leq 45° \quad (1), \text{ and}$$

$$0.5° \leq \angle BOC \leq 45° \quad (2).$$

The disclosure also relates to a process for producing an electrophotographic photosensitive member having an uneven structure on the surface thereof including a process for producing an electrophotographic photosensitive member, and forming the uneven structure on the surface of the electrophotographic photosensitive member using the surface processing process described above.

The disclosure can provide a process for processing the surface of an electrophotographic photosensitive member with high thin line reproducibility and a process for producing the electrophotographic photosensitive member.

Further features of the present invention will become apparent from the following description of exemplary embodiments with reference to the attached drawings.

DESCRIPTION OF THE EMBODIMENTS

The electrophotographic photosensitive member of the disclosure has a resin layer (layer formed using resin).

Hereinafter, the invention is described in detail with examples with reference to the drawings.

The present inventors assume as follows about the reason why the process for processing the surface of the electrophotographic photosensitive member of the invention improves the electrophotographic characteristics, particularly an improvement of thin line reproducibility. Hereinafter, the reason is described with reference to FIG. 1.

As described in Japanese Patent No. 4059518, in the process for bringing the surface of a molding member into pressure contact with the surface of a cylindrical electrophotographic photosensitive member, and transferring an uneven structure on the surface of the molding member (the surface structure corresponding to the uneven structure to be formed on the electrophotographic photosensitive member) to the surface of the electrophotographic photosensitive member while rotating the electrophotographic photosensitive member, the thin line reproducibility is likely to decrease due to the fact that the exposure potential in image exposure (VL potential) is likely to decrease (a reduction in the electrophotographic characteristics). As the reason therefor, it is considered that although the electrophotographic photosensitive member has a cylindrical shape, the molding member does not deform in such a manner as to follow the surface (circumferential surface) of the electrophotographic photosensitive member when brought into pressure contact therewith, and therefore the separation of the resin layer of the electrophotographic photosensitive member (separation from a support or other resin layers) is induced, so that the exposure potential in image exposure decreases.

As a result of the examination of the present inventors, it has found that, by the use of a molding member having an elastic layer as a molding member for transferring the surface structure of the molding member onto the surface of the cylindrical electrophotographic photosensitive member, the molding member deforms in such a manner as to follow the surface (circumferential surface) of the electrophotographic photosensitive member. Furthermore, it has found that, by transferring the surface structure of the molding member onto the surface (circumferential surface) of the electrophotographic photosensitive member along the surface of the electrophotographic photosensitive member in such a manner that the molding member having an elastic layer satisfy Formulas (1) and (2) above when transferring the surface structure of the molding member onto the surface of the electrophotographic photosensitive member, the separation of the resin layer of the electrophotographic photosensitive member is suppressed and the thin line reproducibility noticeably improves.

Figure 1:
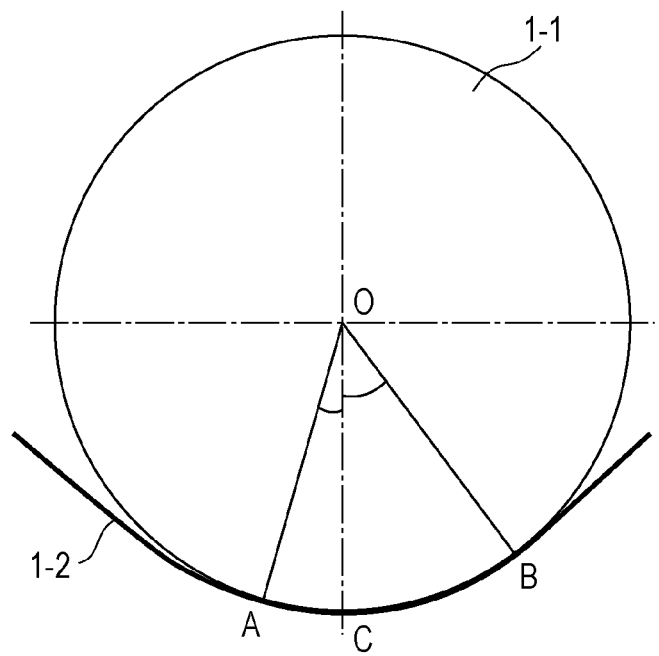
FIG. 1 is a view schematically illustrating the positional relationship of a cylindrical electrophotographic photosensitive member of the invention and a molding member when bringing the surface of the molding member into pressure contact with the surface of the cylindrical electrophotographic photosensitive member.

FIG. 1 is a view schematically illustrating the positional relationship of the cylindrical electrophotographic photosensitive member and the molding member when bringing the surface of the molding member into pressure contact with the surface of the cylindrical electrophotographic photosensitive member. The process for transferring the surface structure on the surface of the molding member onto the surface of the electrophotographic photosensitive member is carried out by bringing the surface of the molding member into pressure contact with the surface of the electrophotographic photosensitive member at a contacting face, and then moving the electrophotographic photosensitive member side or the molding member side while maintaining the state in FIG. 1. It is considered that, with respect to the separation of the resin layer of the electrophotographic photosensitive member, the direction of the normal force to a load applied due to the pressure contact of the surface structure of the molding member with the surface (circumferential surface) of the electrophotographic photosensitive member is important. When the direction of a straight line via both ends (points A and B) of the arc (arc AB) in which the surface structure of the molding member contacts the surface (circumferential surface) of the electrophotographic photosensitive member and the center of the circle of the cross-section of the electrophotographic photosensitive member is close to the normal force, the deforming stress of the resin is dispersed in an almost uniform state. As a result, the maximum stress transmitted to the resin layer of the electrophotographic photosensitive member decreases, so that it is considered that the separation of the resin layer becomes difficult to occur in concave portions in which the shape is transferred.

Specifically, when processing the surface by bringing the surface of the molding member into pressure contact with the surface of the electrophotographic photosensitive member, it is required that ∠AOC and ∠BOC illustrated in FIG. 1 satisfy the following formulas (1) and (2). In FIG. 1, 1-1 denotes the cross-section (electrophotographic photosensitive member) perpendicular to the axis of rotation of the electrophotographic photosensitive member. 1-2 denotes the cross-section (molding member) of the molding member. AB denotes the arc (arc AB) which is a line at the intersection of the cross-section and the contacting face. O denotes the center (center O) of the circle of the cross-section of the electrophotographic photosensitive member. C denotes the intersection (intersection C) of the straight line via the center O among straight lines of the direction of the pressure contact with of the molding member and the arc AB.

$$0.5° \leq \angle AOC \leq 45° \quad (1), \text{ and}$$

$$0.5° \leq \angle BOC \leq 45° \quad (2).$$

As shown in Formulas (1) and (2) above, ∠AOC and ∠BOC each are 0.5° or more and 45° or less. When ∠AOC and ∠BOC are lower than 0.5°, the molding member hardly deforms in such a manner as to follow the surface (circumferential surface) of the electrophotographic photosensitive member in the pressure contact. Therefore, around the point A and the point B, the separation of the resin layer of the electrophotographic photosensitive member is likely to occur. On the other hand, when ∠AOC and ∠BOC each are larger than 45°, the direction of each of the normal forces at the point A and the point B is excessively away from the direction of each of the straight lines via the point A and the point B and the center of the circle of the cross-section of the electrophotographic photosensitive member, so that the separation of the resin layer of the electrophotographic photosensitive member is likely to occur at the point A and the point B. It is considered that the reason therefor is as follows.

Figure 8:
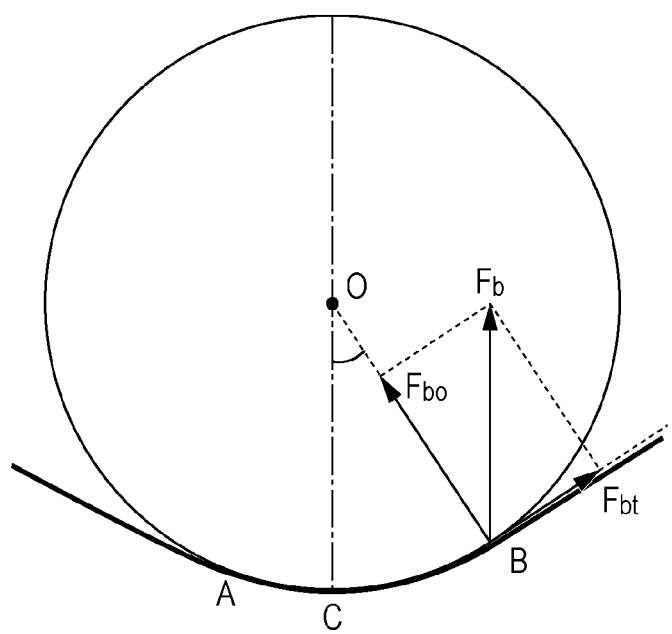
FIG. 8 is a view illustrating the normal force ($F_b$) of the point B, the force in the direction passing through the center O from the point B ($F_{bo}$), and the force in the direction of the tangent of the circle of the cross-section at the point B ($F_{bt}$).

First, the normal forces ($F_a$, $F_b$) of the point A and the point B are the resultant of the forces ($F_{ao}$, $F_{bo}$) in the direction passing through the center O from the point A and the point B and the forces ($F_{at}$, $F_{bt}$) in the direction of the tangent of the circle of the cross-section at the point A and the point B, and it is considered that the $F_{at}$ and the $F_{bt}$ act as force working in the direction of removing the resin layer of the electrophotographic photosensitive member. FIG. 8 illustrates, about mainly the point B, the normal force ($F_b$) at the point B, the force ($F_{bo}$) in the direction passing through the center O from the point B, and the force ($F_{bt}$) in the direction of the tangent of the circle of the cross-section at the point B. In the case of ∠AOC=45° and ∠BOC=45°, the relationships of $F_{ao}$=$F_{at}$ and $F_{bo}$=$F_{bt}$ are established. When ∠AOC and ∠BOC each are larger than 45°, the relationships of $F_{ao}$<$F_{at}$ and $F_{bo}$<$F_{bt}$ are established. Therefore, the force working in the direction of removing the resin layer of the electrophotographic photosensitive member becomes larger than the forces in the direction passing through the center O from the point A and the point B, so that the separation of the resin layer of the electrophotographic photosensitive member is likely to occur. On the other hand, when ∠AOC and ∠BOC each are 0.5° or more and 45° or less, the relationships of $F_{ao}$ $F_{at}$ and $F_{bo}$ $F_{bt}$ are established. Therefore, the force working in the direction of removing the resin layer of the electrophotographic photosensitive member becomes smaller than the forces in the direction passing through the center O from the point A and the point B, so that it is considered that the separation of the resin layer of the electrophotographic photosensitive member is suppressed.

It is also suitable that ∠AOC and ∠BOC satisfy the following formulas (3) and (4), respectively.

$$1° \leq \angle AOC \leq 15° \quad (3),\text{ and}$$

$$1° \leq \angle BOC \leq 15° \quad (4).$$

When ∠AOC and ∠BOC satisfy Formulas (3) and (4) above, the $F_{at}$ and the $F_{bt}$ become smaller, so that the separation of the resin layer of the electrophotographic photosensitive member is further suppressed.

In the electrophotographic photosensitive member of the present disclosure, the circularity of "the circle of the cross-section" is most suitably 0. However, the technical difficulty of the formation of such a cross-section is high and the producing cost also tends to be high. In this respect, a suitable circularity range is 0.2% or less to the average diameter of the circumference of the circle. In the circularity range above, the influence on Formulas (1) and (2) above is very small. The circularity as used herein refers to a deviation from the geometrically correct circle of a circular body. Specifically, the circularity is expressed by a difference of the radii of two geometric concentric circles when a circular body is sandwiched between the two geometric concentric circles, and the interval of the geometric concentric circles becomes the smallest (JIS B 0621-1984).

Figure 7:
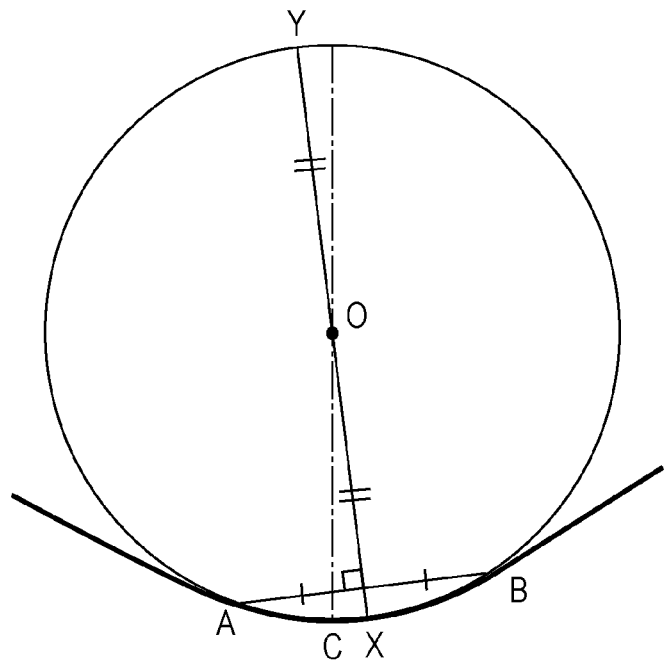
FIG. 7 is a view illustrating a manner for determining the center O of the cross-section and the intersection C of the straight line via the center O of the direction of the pressure contact of the molding member with the arc AB.

In the disclosure, as illustrated in FIG. 7, the "center (center O) of the circle of the cross-section" is the middle point of a chord XY equivalent to the perpendicular bisector of the chord AB. The "intersection (intersection C) of the straight line via the center O of the direction of the pressure contact of the molding member and the arc AB" can be determined from the determined center O.

Figure 6:
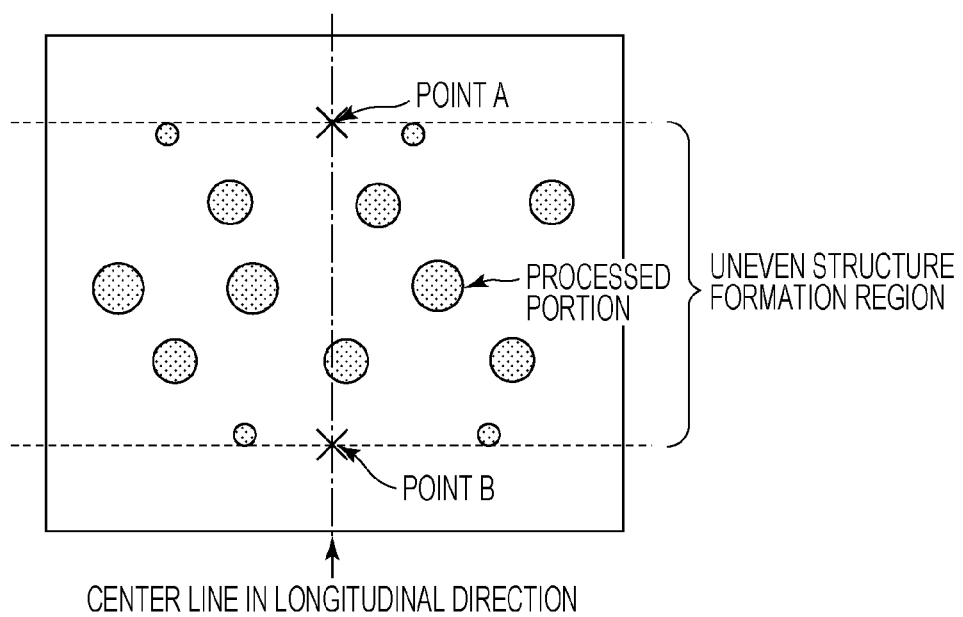
FIG. 6 is a view schematically illustrating a process for specifying points A and B of the invention from a projection in which the surface of the electrophotographic photosensitive member having the uneven structure is viewed from the top.

In Examples of the concepts disclosed herein, the measurement of ∠AOC and ∠BOC is performed by bringing the molding member into pressure contact with the electrophotographic photosensitive member at a pressurization force in a certain range (e.g., 5 to 200 MPa). Then, as illustrated in FIG. 6, the intersections of end portions (horizontal dashed lines of FIG. 6) in a region where the uneven structure (processed portions of FIG. 6) is formed on the surface of the electrophotographic photosensitive member (uneven structure formation region of FIG. 6, contacting face) and the center line (vertical dashed lines of FIG. 6) in the longitudinal direction of the electrophotographic photosensitive member were measured as the point A and the point B.

In the disclosure, the pressurization force when bringing the molding member into pressure contact with the electrophotographic photosensitive member is not limited to the range above. The pressurization force may be changed in the range where the cylindrical shape is maintained and the uneven structure can be transferred onto the surface of the electrophotographic photosensitive member. The effects of the embodiments disclosed herein can be obtained by processing the surface of the electrophotographic photosensitive member with the pressurization force in the range above in such a manner as to satisfy Formulas (1) and (2) above. A specific pressurization force is suitably 10 to 150 MPa and more suitably 20 to 100 MPa.

Figure 2:
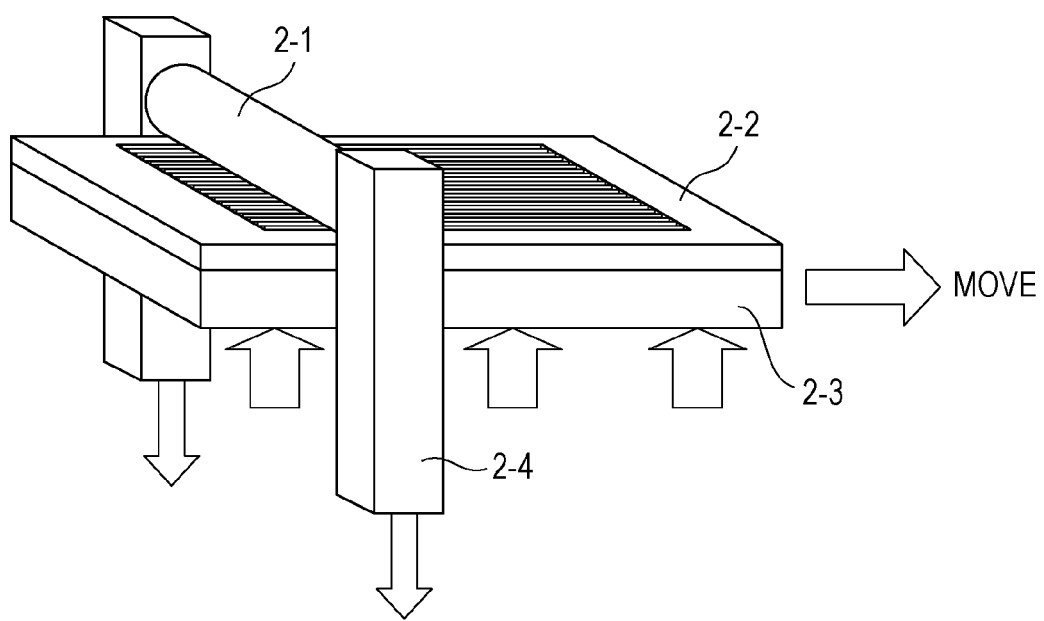
FIG. 2 is a view illustrating an example of a device for bringing the surface of the molding member into pressure contact with the surface of the cylindrical electrophotographic photosensitive member.

FIG. 2 is a view illustrating an example of a pressurized-shape transferring and processing device for carrying out the process for processing the surface of the electrophotographic photosensitive member. According to the pressurized-shape transferring and processing device illustrated in FIG. 2, a molding member 2-2 having an elastic layer is continuously brought into contact with the surface (circumferential surface) of an electrophotographic photosensitive member 2-1 which is a substance to be processed while rotating the same, and then the molding member is moved while pressurizing. Thus, the molding member is continuously brought into pressure contact with the surface (circumferential surface) of the electrophotographic photosensitive member while rotating the same to transfer the surface structure of the molding member onto the surface of the electrophotographic photosensitive member, whereby the uneven structure can be formed on the surface of the electrophotographic photosensitive member. From the viewpoint of efficiently transferring the uneven structure onto the surface of the electrophotographic photosensitive member, the electrophotographic photosensitive member and the molding member may be heated. The molding member 2-2 having an elastic layer is suitably a molding member constituted by three layers of a transfer layer having a surface structure on the surface, a metallic layer, and an elastic layer. The molding member 2-2 having an elastic layer may be a molding member constituted by two layers of a layer in which a transfer layer and a metallic layer are integrated to form one layer and an elastic layer.

Mentioned as the material of a pressurization member 2-3 are, for example, metal, metal oxide, plastic, glass, and the like. Among the above, stainless steel (SUS) is suitable from the viewpoint of mechanical strength, dimension accuracy, and durability. On the upper surface of the pressurization member, a molding member 2-2 having an elastic layer is disposed. The molding member can be brought into contact with the surface of the electrophotographic photosensitive member 2-1 supported by support members 2-4 at a predetermined pressure by a support member (not illustrated) and a pressurization system (not illustrated) at the undersurface side. The support member may be pressed against the pressurization member at a predetermined pressure or the support member and the pressurization member may be pressed against each other. When processing the surface using the pressurized-shape transferring and processing device, the surface processing speed is suitably 0.5 to 80 mm/s in terms that the effects are sufficiently obtained.

In the molding member having an elastic layer, the Young's modulus measured by an ultra-micro-hardness tester is suitably 69 MPa or more and 230 MPa or less in the surface of the molding member having the surface structure. The compressive stress measured by a compressive test in the direction of the pressure contact of the molding member is suitably 0.42 MPa or more and 5.9 MPa or less. When the Young's modulus and the compressive stress satisfy the ranges, features are imparted such that the surface of the molding member has intensity sufficient for transferring the uneven structure onto the surface of the electrophotographic photosensitive member and also the molding member has an elastic layer which is preferentially compressed. Due to the fact that the molding member has the features, when transferring the surface structure of the molding member onto the surface of the electrophotographic photosensitive member, the molding member deforms in such a manner as to follow the surface (circumferential surface) of the electrophotographic photosensitive member, and Formulas (1) and (2) can be satisfied.

The measurement of the Young's modulus by a micro-hardness tester was performed using a molding member with a sufficient size of 100 mm×100 mm or larger in such a manner that the Young's modulus in the vicinity the surface of the molding member can be measured. For the measurement of the Young's modulus by a micro-hardness tester, a micro-hardness tester Fisher scope H100V (manufactured by Fisher Instrument Co.) can be used. The Young's modulus can be determined by a measurement method specified by an ultra-micro load hardness test method ISO 14577 (JIS Z 2255: 2003). As an indenter, a Vickers pyramid diamond indenter with a 136° angle between opposite faces was used. The measurement conditions are as follows: The diamond indenter is pressed into the molding member to be measured to 80 mN over 4 seconds, the state is maintained for 1 second, and then the indenter is drawn out over 4 seconds. The Young's modulus is determined by electrically detecting the pressing depth in the state where a load is applied to the diamond indenter, and then reading the depth. Also in Examples of the invention, the Young's modulus by a micro-hardness tester was measured by the method described above. The measurement of the compressive stress by a compressive test can be performed by a measurement method specified by a calibration method and a verification method of a force-measuring system of a tensile testing machine and a compressive testing machine ISO 7500-1:2004 (JIS B 7721:2009). The compressive stress is obtained by measuring the stress applied when a sample of a molding member with a size of 50 mm×50 mm is compressed in the thickness direction (direction of the cross-section) by 1 mm at a speed of 5 mm/m, and then the state is maintained for 30 seconds. For the measurement of the compressive stress, a tensile and compressive testing machine TGI-50 kN (manufactured by Technograph) can be used. Also in Examples of the invention, the compressive stress by a compressive test was measured by the method described above.

The molding member having an elastic layer is suitably a molding member having a layer structure having a transfer layer having, on the surface, a surface structure to be transferred onto the surface of the electrophotographic photosensitive member, a metallic layer formed directly under the transfer layer, and an elastic layer formed directly under the metallic layer. One in which the transfer layer and the metallic layer form one layer may be acceptable.

The total tension strength of the transfer layer and the metallic layer in the molding member having the transfer layer, the metallic layer, and the elastic layer is suitably 260 MPa or more and 1230 MPa or less. The total thickness of the transfer layer and the metallic layer is suitably in the range of 0.1 mm or more and 5 mm or less. When the tension strength and the thickness of the layers satisfy the ranges above, the transfer layer and the metallic layer deform in such a manner as to follow the deformation of the elastic layer when transferring the surface structure of the molding member onto the surface (circumferential surface) of the electrophotographic photosensitive member. Thus, the molding member deforms in such a manner as to follow the surface (circumferential surface) of the electrophotographic photosensitive member, and Formulas (1) and (2) can be satisfied.

The thickness of the elastic layer is suitably in the range of 1.0 mm to 20 mm. As the elastic layer, silicon rubber, fluorocarbon rubber, urethane rubber, and the like are mentioned, for example. The hardness of the elastic layer is suitably about 30° to about 95° in terms of Shore A. In particular, when the temperature is controlled in processing the surface of the electrophotographic photosensitive member, it is suitable to use silicon rubber and fluorocarbon rubber excellent in heat resistance.

The surface structure of the surface of the molding member of the disclosure is specifically a shape corresponding to the uneven structure to be formed on the electrophotographic photosensitive member. Mentioned as the uneven structure are, for example, metal whose surface is finely processed (having an uneven structure), one whose surface is patterned by resist, a resin film in which fine particles are dispersed, a resin film having a fine uneven structure coated with metal, and the like. The transfer layer suitably contains the same material as that forming the uneven structure and aluminum, nickel, various stainless steels, and the like are used.

As the metallic layer, various metals are mentioned and aluminum, nickel, various stainless steels, and the like are used. In particular, from the viewpoint of the repeated use in producing, one having a high spring deflection limit is suitable.

Next, the uneven structure of the surface of the molding member and the uneven structure of the surface of the transfer layer are described. As the uneven structures, a shape in which a large number of convex portions are formed on a flat surface portion is mentioned, for example. As the shape of the convex portion, the shape of the convex portion as viewed from the top is a circle, an oval, a square, a rectangle, a triangle, a quadrangle, a hexagon, and the like, for example. As the cross-sectional shape of the convex portion, one having edges, such as a triangle, a quadrangle, and a polygon, a wave shape formed by a continuous curve, one in which the edges of a triangle, a quadrangle, and a polygon are partially or entirely deformed into a curve, and the like are mentioned, for example.

According to the disclosure, the electrophotographic photosensitive member can be produced by processing the surface of the electrophotographic photosensitive member before the formation of the uneven structure by these surface processing processes.

Configuration of Electrophotographic Photosensitive Member

The electrophotographic photosensitive member generally has a cylindrical support and a photosensitive layer (one of resin layers) formed using resin on the support.

Mentioned as the photosensitive layer are a single-layer type photosensitive layer in which a charge transporting substance and a charge generating substance are contained in the same layer and a laminated type (functional separation type) photosensitive layer in which layers are separated into a charge generating layer containing a charge generating substance and a charge transporting layer containing a charge transporting substance. From the viewpoint of the electrophotographic characteristics, the laminated type photosensitive layer is suitable. The laminated type photosensitive layer may be a normally laminated type photosensitive layer in which the charge generating layer and the charge transporting layer are laminated in this order from the support side or a reversely laminated type photosensitive layer in which the charge transporting layer and the charge generating layer are laminated in this order from the support side. From the viewpoint of the electrophotographic characteristics, the normally laminated type photosensitive layer is suitable. The charge generating layer may have a laminated configuration or the charge transporting layer may have a laminated configuration.

The support is suitably one showing conductivity (conductive support). Mentioned as the material of the support are, for example, metals (alloys), such as iron, copper, gold, silver, aluminum, zinc, titanium, lead, nickel, tin, antimony, indium, chromium, aluminum alloy, and stainless steel. Metal supports and plastic supports having a coating film formed by vacuum deposition using aluminum, aluminum alloy, indium oxide-tin oxide alloy, and the like can also be used. Moreover, supports obtained by impregnating plastic and paper with conductive particles, such as carbon black, tin oxide particles, titanium oxide particles, and silver particles, and supports formed with a conductive binder resin can also be used.

The surface of the support may be subjected to cutting treatment, surface roughening treatment, alumite treatment, and the like for the purpose of suppressing the interference fringe due to scattering of laser light.

Between the support and an undercoat layer described later or the photosensitive layer (the charge generating layer, the charge transporting layer), a conductive layer may be provided for the purpose of suppressing the interference fringe due to scattering of laser light, covering defects of the support, and the like.

The conductive layer can be formed by applying a coating liquid for conductive layer obtained by dispersing carbon black, a conductive pigment, a resistance adjusting pigment, and the like with a binder resin, and then drying the obtained coating film. To the coating liquid for conductive layer, a compound which is cured and polymerized by heating, ultraviolet exposure, irradiation with radiation, and the like may be added. The conductive layer obtained by dispersing a conductive pigment, a resistance adjusting pigment, and the like, the surface tends to be roughened.

As a solvent of the coating liquid for conductive layer, an ether solvent, an alcohol solvent, a ketone solvent, an aromatic hydrocarbon solvent, and the like are mentioned. The film thickness of the conductive layer is suitably 0.2 µm or more and 40 µm or less, more suitably 1 µm or more and 35 µm or less, and still more suitably 5 µm or more and 30 µm or less.

Mentioned as the binder resin for use in the conductive layer are, for example, polymers of vinyl compounds, such as styrene, vinyl acetate, vinyl chloride, acrylic acid ester, methacrylic acid ester, vinylidene fluoride, and trifluoro ethylene, polyvinyl alcohol resin, polyvinyl acetal resin, polycarbonate resin, polyester resin, polysulfone resin, polyphenylene oxide resin, polyurethane resin, cellulosic resin, phenol resin, melamine resin, silicon resin, epoxy resin, and the like.

Mentioned as the conductive pigment and the resistance adjustment pigment are, for example, particles of metals (alloys), such as aluminum, zinc, copper, chromium, nickel, silver, and stainless steel, those obtained by vapor-depositing the same onto the surface of plastic particles, and the like. Moreover, particles of metal oxides, such as zinc oxide, titanium oxide, tin oxide, antimony oxide, indium oxide, bismuth oxide, indium oxide doped with tin, tin oxides doped with antimony and tantalum, and the like can also be used. These substances may be used singly or in combination of two or more kinds thereof. When two or more kinds of them are used in combination, the substances may be simply mixed or formed into a solid solution or a fused substance.

Between the support or the conductive layer and the photosensitive layer (the charge generating layer, the charge transporting layer), an undercoat layer (intermediate layer) having a barrier function and an adhesion function may be provided for the purpose of an improvement of adhesion of the photosensitive layer, an improvement of coatability, an improvement of charge injection properties from the support, a protection of the photosensitive layer from electrical breakdown, and the like.

The undercoat layer can be formed by applying a coating liquid for undercoat layer obtained by dissolving resin (binder resin) in a solvent, and drying the obtained coating film.

Mentioned as the resin for use in the undercoat layer is, for example, polyvinyl alcohol resin, poly-N-vinyl imidazole, polyethylene oxide resin, ethyl cellulose, an ethylene-acrylic acid copolymer, casein, polyamide resin, N-methoxy methylated-6 nylon, nylon copolymer, phenol resin, polyurethane resin, epoxy resin, acrylic resin, melamine resin, polyester resin, or the like.

For the undercoat layer, metal oxide particles may be further compounded, and particles containing titanium oxide, zinc oxide, tin oxide, zirconium oxide, and aluminum oxide are mentioned. The metal oxide particles may be metal oxide particles whose surface is treated by coupling agents, such as a silane coupling agent.

Mentioned as the solvent for use in the coating liquid for undercoat layer are organic solvents, such as alcohol solvents, sulfoxide solvents, ketone solvents, ether solvents, ester solvents, aliphatic halogenated hydrocarbon solvents, and aromatic compounds. The film thickness of the undercoat layer is suitably 0.05 µm or more and 30 µm or less and more suitably 1 µm or more and 25 µm or less. For the undercoat layer, organic resin particles and a leveling agent may be further compounded.

Mentioned as the charge generating substances for use in the photosensitive layer are, for example, a pyrylium dye, a thiapyrylium dye, phthalocyanine pigments having various central metals and various crystal types (e.g., α, β, γ, and X type), an anthoantron pigment, a dibenzpyrenequinone pigment, a pyranetron pigment, azo pigments, such as a monoazo pigment, a dis-azo pigment, and a tris-azo pigment, an indigo pigment, a quinacrydon pigment, an asymmetric quinocyanine pigment, a quinocyanine, and the like. These charge generating substances may be used singly or in combination of two or more kinds thereof.

Mentioned as the charge transporting substances for use in the photosensitive layer are, for example, a pyrene compound, an N-alkyl carbazole compound, a hydrazone compound, an N,N-dialkyl aniline compound, a diphenylamine compound, a triphenyl amine compound, a triphenylmethane compound, a pyrazoline compound, a styryl compound, a triaryl amine compound, a stilbene compound, and the like.

When the photosensitive layer is a laminated type photosensitive layer, the charge generating layer can be formed by applying a coating liquid for charge generating layer obtained by dispersing the charge generating substance with a binder resin and a solvent, and drying the obtained coating film. The charge generating layer may be a vapor deposited film of the charge generating substance.

The mass ratio of the charge generating substance and the binder resin is suitably in the range of 1:0.3 to 1:4.

Mentioned as dispersion methods are, for example, methods using a homogenizer, ultrasonic dispersion, a ball mill, a vibratory ball mill, a sand mill, an attritor, a roll mill, and the like.

Mentioned as the solvent for use in the coating liquid for charge generating layer are alcohol solvents, sulfoxide solvents, ketone solvents, ether solvents, ester solvents, aliphatic halogenated hydrocarbon solvents, aromatic compounds, and the like.

The charge transporting layer can be formed by applying a coating liquid for charge transporting layer obtained by dissolving a charge transporting substance and a binder resin in a solvent, and then drying the obtained coating film. When using the charge transporting substance having film formability alone, the charge transporting layer can be formed without using a binder resin.

Mentioned as the binder resin for use in the charge generating layer and the charge transporting layer are, for example, polymers of vinyl compounds, such as styrene, vinyl acetate, vinyl chloride, acrylic acid ester, methacrylic acid ester, vinylidene fluoride, and trifluoro ethylene, polyvinyl alcohol resin, polyvinyl acetal resin, polycarbonate resin, polyester resin, polysulfone resin, polyphenylene oxide resin, polyurethane resin, cellulosic resin, phenol resin, melamine resin, silicon resin, epoxy resin, and the like.

Mentioned as the solvent for use in the coating liquid for charge transporting layer are alcohol solvents, sulfoxide solvents, ketone solvents, ether solvents, ester solvents, aliphatic halogenated hydrocarbon solvents, aromatic hydrocarbon solvents, and the like.

The film thickness of the charge generating layer is suitably 5 μm or less and more suitably 0.1 to 2 μm.

The film thickness of the charge transporting layer is suitably 5 to 50 μm and more suitably 10 to 35 μm.

From the viewpoint of an improvement of the durability of the electrophotographic photosensitive member, it is suitable to form a surface layer of the electrophotographic photosensitive member with a crosslinking organic polymer.

For example, the charge transporting layer on the charge generating layer can be formed with a crosslinking organic polymer as the surface layer of the electrophotographic photosensitive member. Or, the surface layer formed with a crosslinking organic polymer as a second charge transporting layer or a protective layer can be formed on the charge transporting layer formed on the charge generating layer. The property required in the surface layer formed with a crosslinking organic polymer is to achieve both wear resistance and charge transportability. From the viewpoint of achieving the property, it is suitable to form the surface layer using a charge transporting substance or conductive particles and a crosslinking polymerizable monomer/oligomer.

As the charge transporting substance, the charge transporting substances mentioned above can be used. Mentioned as the crosslinking polymerizable monomer/oligomer are, for example, compounds having chain polymerizable functional groups, such as an acryloyloxy group, a metacryloyloxy group, and a styryl group, compounds having sequential polymerizable functional groups, such as a hydroxyl group, an alkoxysilyl machine, and an isocyanate group, and the like.

From the viewpoint of achieving both wear resistance and charge transportability, it is more suitable to use a compound having both a charge transportable structure (preferably hole transportable structure) and an acryloyloxy group in the same molecules.

As crosslinking and curing methods, methods using heat, ultraviolet rays, and radiation are mentioned, for example.

The film thickness of the surface layer formed with a crosslinking organic polymer is suitably 0.1 to 30 μm and more suitably 1 to 10 μm. As the solvent for use in the coating liquid for surface layer, the same solvents as the solvents for use in the coating liquid for charge transporting layer is mentioned.

To each layer of the electrophotographic photosensitive member, additives can be added. Mentioned as the additives are, for example, degradation prevention agents, such as an antioxidant and an ultraviolet absorber, organic resin particles, such as fluorine atom containing resin particles and acrylic resin particles, inorganic particles, such as silica, titanium oxide, and alumina, and the like.

EXAMPLES

Hereinafter, the embodiments disclosed herein are described in detail with reference to specific Examples. In the following Examples, "part(s)" means a "part by mass". The electrophotographic photosensitive member is also simply referred to as a "photoconductor" below.

Production Example of Photoconductor A-1

An aluminum cylinder of 30.7 mm in diameter and 370 mm in length was used as a cylindrical support (conductive support).

Next, 60 parts of barium sulfate particles coated with tin oxide (Product name: Pastran PC1, manufactured by MITSUI MINING & SMELTING CO., LTD.), 15 parts of titanium oxide particles (Product name: TITANIX JR, manufactured by TAYCA CORP.), 43 parts of resol type phenol resin (Product name: Phenolite J-325, manufactured by Dainippon Ink & Chemicals, Inc., solid content of 70% by mass), 0.015 part of silicone oil (Product name: SH28PA, manufactured by Toray Silicone Industries Inc.), 3.6 parts of silicone resin particles (Product name: Tospearl 120, manufactured by Toshiba Silicone Co., Ltd), 50 parts of 2-methoxy-1-propanol, and 50 parts of methanol were put in a ball mill, and then dispersed for 20 hours, thereby preparing a coating liquid for conductive layer. The coating liquid for conductive layer was applied onto a support by dipping, the obtained coating film was heated at 140° C. for 1 hour to be cured, thereby forming a conductive layer having a film thickness of 15 μm.

Next, 10 parts of nylon copolymer (Product name: Amilan CM8000, manufactured by Toray Industries, Inc.) and 30 parts of methoxy methylated 6 nylon resin (Product name: Toresin EF-30T, manufactured by Teikoku Chemical Industry Co., Ltd.) were dissolved in a mixed solvent of 400 parts of methanol and 200 parts of n-butanol, thereby preparing a coating liquid for undercoat layer. The coating liquid for undercoat layer was applied onto the conductive layer by dipping, and then the obtained coating film was dried at 100° C. for 30 minutes, thereby forming an undercoat layer having a film thickness of 0.45 μm.

Next, 20 parts of hydroxy gallium phthalocyanine crystals (charge generating substance) in a crystal form having an intense peak at Bragg angles (2θ±0.2°) of 7.4° and 28.2° in CuKα characteristic X ray diffraction, 0.2 part of a calixarene compound represented by the following structural formula (1), 10 parts of polyvinyl butyral resin (Product name: S-LEC BX-1, manufactured by Sekisui Chemical Co., Ltd.), and 600 parts of cyclohexanone were put in a sand mill using 1 mm diameter glass beads, the mixture was dispersed for 4 hours, and then 700 parts of ethyl acetate was added, thereby preparing a coating liquid for charge generating layer. The coating liquid for charge generating layer was applied onto the undercoat layer by dipping, and then the obtained coating film was dried at 80° C. for 15 minutes, thereby forming a charge generating layer having a film thickness of 0.17 μm.

PF-040, manufactured by Advantec Toyo Kaisha, Ltd.). Thereafter, 90 parts of a hole transportable compound represented by the following structural formula (3), 70 parts of 1,1,2,2,3,3,4-heptafluoro cyclopentane, and 70 parts of 1-propanol were added to the mixed solvent. By filtering the mixture through a polyfron filter (Product name: PF-020, manufactured by Advantec Toyo Kaisha, Ltd.), a coating liquid for second charge transporting layer (protective layer) was prepared. The coating liquid for second charge transporting layer was applied onto the charge transporting layer by dipping, and the obtained coating film was dried at 50° C. for 10 minutes in the atmosphere. Thereafter, the coating film was irradiated with electron beams for 1.6 seconds in nitrogen under the conditions of an accelerating voltage of 150 kV and a beam current 3.0 mA while rotating the support (irradiation

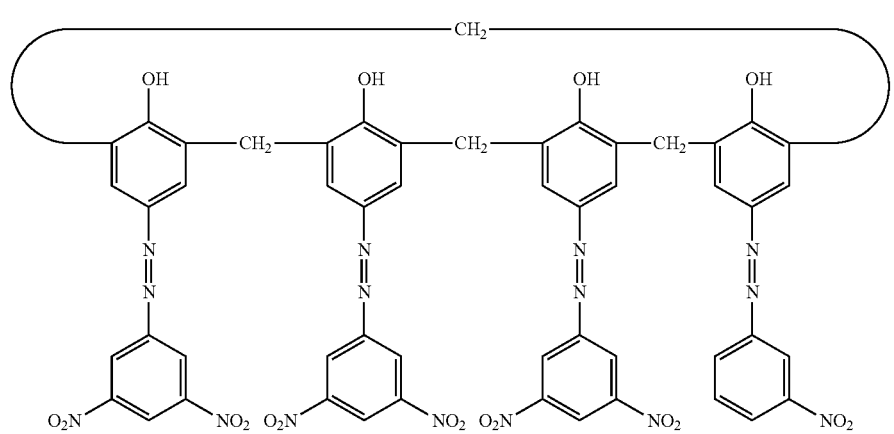

(1)

Next, 70 parts of a compound represented by the following structural formula (2) (charge transporting substance (hole transportable compound)) and 100 parts of polycarbonate resin (Product name: Iupilon 2400, manufactured by Mitsubishi Engineering Plastics, Bisphenol Z type polycarbonate) were dissolved in a mixed solvent of 600 parts of o-xylene and 200 parts of dimethoxy methane, thereby preparing a coating liquid for charge transporting layer. The coating liquid for charge transporting layer was applied onto the charge transporting layer by dipping, and then the obtained coating film was dried at 100° C. for 30 minutes, thereby forming a charge transporting layer having a film thickness of 15 μm.

target) at 200 rpm. The absorbed dose of the electron beams at this time was measured to be 15 kGy. Subsequently, the temperature was increased from 25° C. to 125° C. in nitrogen over 30 seconds to heat the coating film. The oxygen concentration of the atmosphere of the electron beam irradiation and the subsequent heating was 15 ppm or less. Next, the coating film was naturally cooled to 25° C. in the atmosphere, and then heated at 100° C. for 30 minutes in the atmosphere, thereby obtaining a second charge transporting layer (protective layer) having a film thickness of 5 μm.

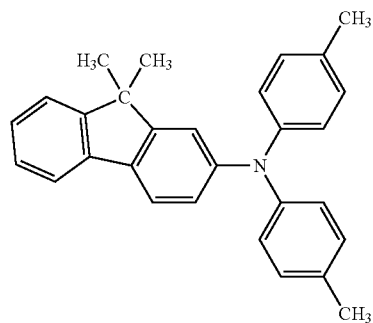

(2)

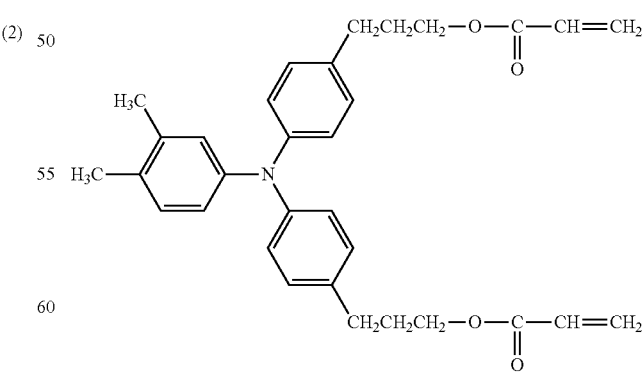

(3)

Next, a mixed solvent of 20 parts of 1,1,2,2,3,3,4-heptafluoro cyclopentane (Product name: ZEORORA H, manufactured by Nippon Zeon Co., Ltd.) and 20 parts of 1-propanol was filtered through a polyfron filter (Product name:

Thus, a cylindrical electrophotographic photosensitive member before forming an uneven structure on the surface was produced.

Example 1

Figure 5:
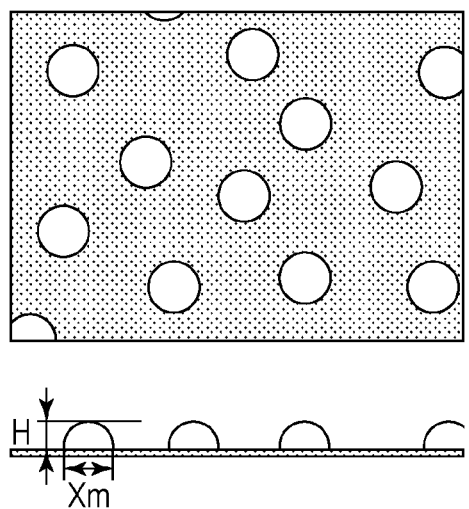
FIG. 5 is a view illustrating an uneven structure of the surface of the molding member used in Examples of the electrophotographic photosensitive member.

Conditions of Surface Processing by Transferring Molding Member Pressurized Structure The uneven structure was transferred by a pressurized-shape transferring and processing device whose configuration is almost illustrated in FIG. 2. In the molding member having an elastic layer, a metallic layer, and a transfer layer, one in which random (Error diffusion method (Floyd & Steinberg method)) convex portions whose shape is almost illustrated in FIG. 5 are disposed on a flat surface was used as the surface structure of the transfer layer. In FIG. 5, the surface structure of the transfer layer has a circular shape having a longest diameter Xm (Longest diameter when the convex portion on the molding member is viewed from the top) of 50 μm and a dome shape having a height H of 6.5 μm. The area of the convex portion structure occupying the entire surface of the transfer layer was 10%. For the transfer layer, one manufactured from nickel was used. For the metallic layer, stainless steel (SUS304-CSP 1/2H) was used and the total thickness of the transfer layer and the metallic layer was 1.0 mm. For the elastic layer, silicon rubber (Thickness: 6 mm) was used.

The Young's modulus of the surface of the molding member by an ultra-micro-hardness tester, the compressive stress by a compressive test in the direction of the pressure contact of the molding member, and the total tension strength of the transfer layer and the metallic layer were measured by the methods described above.

Figure 3:
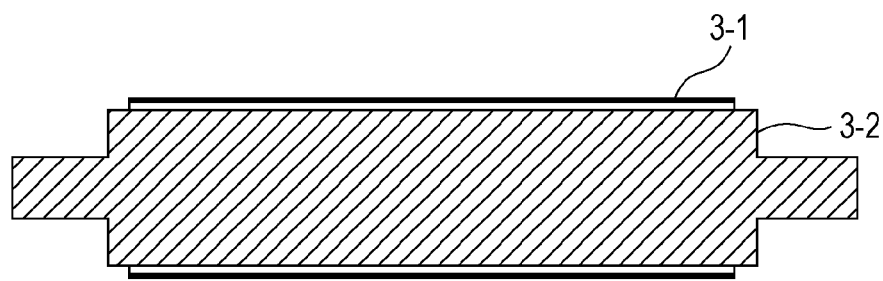
FIG. 3 is a view illustrating a member to be inserted into the cylindrical electrophotographic photosensitive member when bringing the surface of the molding member into pressure contact with the surface of the cylindrical electrophotographic photosensitive member.

Into the electrophotographic photosensitive member 3-1 (Photoconductor A-1) before the formation of the uneven structure, an insertion member 3-2 illustrated in FIG. 3 formed with a hard metal D40 was inserted, it was attached to support members 2-4 of the electrophotographic photosensitive member, and then surface processing was performed.

In processing, the temperatures of the electrophotographic photosensitive member and the molding member were controlled in such a manner that the temperature of the electrophotographic photosensitive member reached 23° C. and the temperature of the surface of the molding member reached 23° C., the electrophotographic photosensitive member and the pressurization member were moved while being pressed against each other at a pressure of 60 MPa, and then the electrophotographic photosensitive member was rotated in the circumferential direction to transfer the uneven structure to the entire surface (circumferential surface) of the electrophotographic photosensitive member. Thus, the electrophotographic photosensitive member having the uneven structure on the surface was produced.

Measurement of ∠AOC and ∠BOC

In Example 1, for the measurement of ∠AOC and ∠BOC, the molding member was brought into pressure contact with the electrophotographic photosensitive member at 60 MPa, and then the point A and the point B were specified as described with reference to FIG. 6. The center O and the intersection C were determined from the point A and the point B. The line segment (diameter of a cross-sectional circle) in a range where the perpendicular bisector of the chord AB and the cross-sectional circle cross was measured to be 30.7 mm. By measuring the distance of the arc AC and the arc BC, it was found that Arc AC=Arc BC=0.55 mm was established. From the diameter of the cross-sectional circle, ∠AOC=∠BOC=2.1° was given.

Thus, the electrophotographic photosensitive member having the uneven structure on the surface was added to a cyan station of a modified machine of an electrophotographic device (copying machine) manufactured by CANON KABUSHIKI KAISHA (Product name: iR-ADV C7055) which is an evaluation device, and then a test and evaluation were performed as follows.

First, under an environment of a temperature of 23° C. and a humidity of 50% RH, the conditions of a charging apparatus and an image exposure apparatus were adjusted in such a manner that the dark part potential (Vd) of the electrophotographic photosensitive member was −700 V and the bright part potential (Vl) thereof was −200 V, and then the initial potential of the electrophotographic photosensitive member was adjusted.

Image Evaluation Method (Evaluation Method for Thin Line Reproducibility)

For the evaluation of thin line reproducibility, a test chart in which alphabetical letters (A to Z letters) of a 2 point size and a 3 point size and complicated Chinese characters were arranged with an output resolution of 1200 dpi was created. The resolution (thin line reproducibility) of the electrophotographic photosensitive member was evaluated by images outputting the test chart. Specifically, the output image was read at a resolution of 1600 dpi using a scanner (CanoScan9900F, manufactured by CANON KABUSHIKI KAISHA), and then the read image data was compared with the original data of the test chart. For the read image data, the area of a portion shifted (widening and narrowing) from the characters of the test chart (original data) was calculated, and the resolution of the electrophotographic photosensitive member was evaluated by the numerical value of the area. For the obtained result, relative evaluation in which the area of the shifted portion of the electrophotographic photosensitive member of Comparative Example 1 was a reference, i.e., 100%, was performed. The results are shown in Table 1. It was judged that when the relative evaluation was 95% or less as compared with the reference (Comparative Example 1), the effects of the disclosure are obtained.

Example 2

Surface processing, measurement of ∠AOC and ∠BOC, measurement of the molding member, and image evaluation were performed in the same manner as in Example 1, except controlling the temperature in such a manner that the temperature of the electrophotographic photosensitive member was 55° C. and the temperature of the surface of the molding member was 150° C. in the surface processing in Example 1. The results are shown in Table 1.

Example 3

Surface processing, measurement of ∠AOC and ∠BOC, measurement of the molding member, and image evaluation were performed in the same manner as in Example 1, except changing the metallic layer of the molding member to SUS304 in Example 1. The results are shown in Table 1.

Example 4

Surface processing, measurement of ∠AOC and ∠BOC, measurement of the molding member, and image evaluation were performed in the same manner as in Example 3, except controlling the temperature in such a manner that the temperature of the electrophotographic photosensitive member was 55° C. and the temperature of the surface of the molding member was 150° C. in the surface processing in Example 3. The results are shown in Table 1.

Example 5

Figure 4:
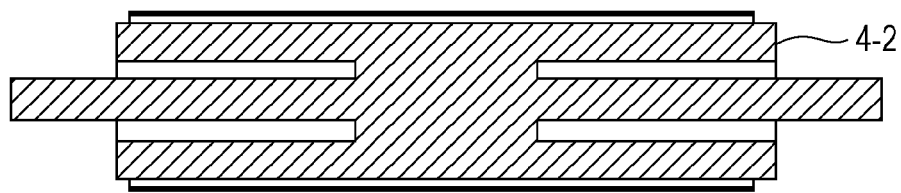
FIG. 4 is a view illustrating a member to be inserted into the cylindrical electrophotographic photosensitive member when bringing the surface of the molding member into pressure contact with the surface of the cylindrical electrophotographic photosensitive member.

Surface processing, measurement of ∠AOC and ∠BOC, measurement of the molding member, and image evaluation were performed in the same manner as in Example 1, except changing the insertion member 3-2 to an insertion member 4-2 illustrated in FIG. 4 in the surface processing in Example 1. The results are shown in Table 1.

Example 6

Surface processing, measurement of ∠AOC and ∠BOC, measurement of the molding member, and image evaluation were performed in the same manner as in Example 1, except tilting the pressurization member, which was in parallel to the pressurization direction, by 0.5° in the pressurization direction in Example 1. The results are shown in Table 1.

Examples 7 to 23

Surface processing, measurement of ∠AOC and ∠BOC, measurement of the molding member, and image evaluation were performed in the same manner as in Example 1, except changing the configuration of the molding member as shown in Table 1. The results are shown in Table 1.

Example 24

Surface processing, measurement of ∠AOC and ∠BOC, measurement of the molding member, and image evaluation were performed in the same manner as in Example 1, except changing the pressure when pressing the electrophotographic photosensitive member and the pressurization member against each other to 5 MPa from 60 MPa and changing the configuration of the molding member to that of Example 21 in Example 1. The results are shown in Table 1.

Example 25

Surface processing, measurement of ∠AOC and ∠BOC, measurement of the molding member, and image evaluation were performed in the same manner as in Example 1, except changing the pressure when pressing the electrophotographic photosensitive member and the pressurization member against each other to 200 MPa from 60 MPa and changing the configuration of the molding member to that of Example 20 in Example 1. The results are shown in Table 1.

Example 26

Surface processing, measurement of ∠AOC and ∠BOC, measurement of the molding member, and image evaluation were performed in the same manner as in Example 1, except changing the pressure when pressing the electrophotographic photosensitive member and the pressurization member against each other to 150 MPa from 60 MPa and changing the configuration of the molding member to that of Example 19 in Example 1. The results are shown in Table 1.

Example 27

Surface processing, measurement of ∠AOC and ∠BOC, measurement of the molding member, and image evaluation were performed in the same manner as in Example 1, except not forming conductive layer and changing the undercoat layer to the following one in Example 1. The results are shown in Table 1.

100 parts of zinc oxide particles (Specific surface area: 19 m$^2$/g, Powder resistance: $4.7 \times 10^6$ Ω·cm) as metal oxide particles was mixed and stirred with 500 parts of toluene, 0.8 part of a silane coupling agent (Compound name: N-2-(aminoethyl)-3-aminopropylmethyl dimethoxysilane, Product name: KBM602, manufactured by Shin-Etsu Chemical Co., Ltd.) was added to the mixture, and the mixture was stirred for 6 hours. Thereafter, the toluene was distilled off under reduced pressure, and then dried by heating at 130° C. for 6 hours, thereby obtaining surface-treated zinc oxide particles.

Next, 15 parts of butyral resin (Product name: BM-1, manufactured by Sekisui Chemical Co., Ltd.) and 15 parts of blocked isocyanate (Product name: Sumidule 3175, manufactured by Sumitomo Bayer Urethane Co., Ltd) were dissolved in a mixed solution of 73.5 parts of methyl ethyl ketone and 73.5 parts of 1-butanol. 80.8 parts of the surface-treated zinc oxide particles and 0.8 part of 2,3,4-trihydroxy benzophenone (manufactured by Tokyo Kasei Kogyo Co., Ltd.) were added to the solution, and the resultant solution was dispersed by a sand mill device using 0.8 mm diameter glass beads for 3 hours under an atmosphere of 23±3° C. After the dispersion, 0.01 part of silicone oil (Product name: SH28PA, manufactured by Dow Corning Toray Silicone Co., Ltd.) and 5.6 parts of crosslinked polymethyl methacrylate (PMMA) particles (Product name: TECHPOLYMER SSX-102, manufactured by Sekisui Plastics Co., Ltd., Average primary particle diameter of 2.5 μm) were added and stirred, thereby preparing a coating liquid for undercoat layer.

The coating liquid for undercoat layer was applied onto the support by dipping, and then the obtained coating film was dried at 160° C. for 40 minutes, thereby forming an undercoat layer having a film thickness of 18 μm.

Comparative Example 1

Surface processing, measurement of ∠AOC and ∠BOC, measurement of the molding member, and image evaluation were performed in the same manner as in Example 1, except changing the configuration to a configuration containing only a transfer layer by removing the metallic layer and the elastic layer from the molding member in Example 1. The results are shown in Table 1.

Comparative Example 2

Surface processing, measurement of ∠AOC and ∠BOC, measurement of the molding member, and image evaluation were performed in the same manner as in Example 1, except changing the configuration of the molding member as shown in Table 1 in Example 1. The results are shown in Table 1.

TABLE 1

| | Molding member | | | | | | Measured values | | | | |
|---|---|---|---|---|---|---|---|---|---|---|---|
| | | | Transfer layer + Metallic layer | | Elastic layer | | | | | | |
| | Transfer layer Material | Metallic layer Material | Thickness (mm) | Tension strength (MPa) | Material | Thickness (mm) | Young's modulus (GPa) | Compressive stress (MPa) | ∠AOC (°) | ∠BOC (°) | Thin line reproducibility |
| Ex. 1 | nickel | SUS304-CSP1/2H | 1.0 | 750 | silicon rubber | 6 | 207 | 0.62 | 2.1 | 2.1 | 48% |

TABLE 1-continued

| | Molding member | | | | | | Measured values | | | | |
|---|---|---|---|---|---|---|---|---|---|---|---|
| | Transfer layer + Metallic layer | | | | Elastic layer | | | | | | |
| | Transfer layer Material | Metallic layer Material | Thickness (mm) | Tension strength (MPa) | Material | Thickness (mm) | Young's modulus (GPa) | Compressive stress (MPa) | ∠AOC (°) | ∠BOC (°) | Thin line reproducibility |
| Ex. 2 | nickel | SUS304-CSP1/2H | 1.0 | 750 | silicon rubber | 6 | 207 | 0.62 | 2.1 | 2.1 | 51% |
| Ex. 3 | nickel | SUS304 | 1.0 | 560 | silicon rubber | 6 | 207 | 0.62 | 2.6 | 2.6 | 58% |
| Ex. 4 | nickel | SUS304 | 1.0 | 560 | silicon rubber | 6 | 207 | 0.62 | 2.6 | 2.6 | 53% |
| Ex. 5 | nickel | SUS304-CSP1/2H | 1.0 | 750 | silicon rubber | 6 | 207 | 0.62 | 2.1 | 2.1 | 56% |
| Ex. 6 | nickel | SUS304-CSP1/2H | 1.0 | 750 | silicon rubber | 6 | 207 | 0.62 | 2.6 | 1.6 | 53% |
| Ex. 7 | nickel | SUS304-CSP1/2H | 0.5 | 770 | silicon rubber | 10 | 207 | 0.62 | 4.2 | 4.2 | 50% |
| Ex. 8 | nickel | SUS304 | 2.0 | 540 | silicon rubber | 6 | 207 | 0.62 | 1.8 | 1.8 | 58% |
| Ex. 9 | nickel | SUS304 | 2.0 | 540 | silicon rubber | 3 | 207 | 0.62 | 1.6 | 1.6 | 59% |
| Ex. 10 | nickel | NSS431DP-2 | 1.0 | 1180 | silicon rubber | 6 | 207 | 0.62 | 1.1 | 1.1 | 56% |
| Ex. 11 | nickel | SUS304 | 0.5 | 580 | silicon rubber | 6 | 207 | 0.45 | 13.3 | 13.3 | 51% |
| Ex. 12 | nickel | SUS304 | 0.5 | 530 | silicon rubber | 10 | 207 | 0.45 | 15.0 | 15.0 | 53% |
| Ex. 13 | nickel | NSS431DP-2 | 1.0 | 1190 | silicon rubber | 12 | 207 | 0.62 | 1.0 | 1.0 | 54% |
| Ex. 14 | SUS631 | NSS431DP-2 | 1.2 | 1200 | urethane rubber | 8 | 204 | 2.7 | 0.6 | 0.6 | 63% |
| Ex. 15 | SUS631 | NSS431DP-2 | 1.0 | 1200 | silicon rubber | 8 | 204 | 1.3 | 0.9 | 0.9 | 62% |
| Ex. 16 | SUS304 | magnesium | 2.5 | 290 | urethane rubber | 20 | 197 | 3.1 | 24.2 | 24.2 | 70% |
| Ex. 17 | SUS304 | aluminum | 2.0 | 270 | silicon rubber | 20 | 197 | 0.78 | 39.0 | 39.0 | 65% |
| Ex. 18 | nickel | magnesium | 5.0 | 260 | urethane rubber | 18 | 207 | 4.1 | 15.8 | 15.8 | 74% |
| Ex. 19 | SUS631 | none | 0.1 | 1230 | urethane rubber | 3 | 204 | 0.58 | 0.8 | 0.8 | 60% |
| Ex. 20 | KF2 alloy | none | 0.08 | 1570 | silicon rubber | 2 | 230 | 0.42 | 0.6 | 0.6 | 76% |
| Ex. 21 | aluminum | magnesium | 6.0 | 60 | urethane rubber | 20 | 69 | 5.9 | 32.0 | 32.0 | 89% |
| Ex. 22 | magnesium | aluminum | 1.0 | 60 | silicon rubber | 20 | 40 | 0.40 | 45.0 | 45.0 | 93% |
| Ex. 23 | tungsten | KF2 alloy | 0.5 | 1560 | urethane rubber | 1 | 345 | 6.2 | 0.5 | 0.5 | 91% |
| Ex. 24 | aluminum | magnesium | 6.0 | 60 | urethane rubber | 20 | 69 | 5.9 | 19.7 | 19.7 | 84% |
| Ex. 25 | KF2 alloy | none | 0.08 | 1570 | silicon rubber | 2 | 230 | 0.42 | 21.1 | 21.1 | 79% |
| Ex. 26 | SUS631 | none | 0.1 | 1230 | urethane rubber | 3 | 204 | 0.58 | 25.2 | 25.2 | 92% |
| Ex. 27 | nickel | SUS304-CSP1/2H | 1.0 | 750 | silicon rubber | 6 | 207 | 0.62 | 2.7 | 2.7 | 56% |
| Comp. Ex. 1 | nickel | — | 0.3 | 600 | — | — | 207 | — | 0.2 | 0.2 | 100% |
| Comp. Ex. 2 | nickel | — | 0.3 | 600 | urethane rubber | 30 | 207 | 0.38 | 48.1 | 48.1 | 108% |

Example 28

Surface processing, measurement of ∠AOC and ∠BOC, measurement of the molding member, and image evaluation were performed in the same manner as in Example 1, except using an aluminum cylinder of 84.3 mm in diameter and 372 mm in length as the support (cylindrical support) in Example 1. The reference of the area of the shifted portion was Comparative Example 3. The results are shown in Table 2.

Comparative Example 3

Surface processing, measurement of ∠AOC and ∠BOC, measurement of the molding member, and image evaluation were performed in the same manner as in Example 28, except changing the configuration to a configuration containing only a transfer layer by removing the metallic layer and the elastic layer from the molding member in Example 28. The results are shown in Table 2.

TABLE 2

| | Molding member | | | | | | Measured values | | | | |
| --- | --- | --- | --- | --- | --- | --- | --- | --- | --- | --- | --- |
| | Transfer layer + Metallic layer | | | Tension | Elastic layer | | Young's | | | | Thin line |
| | Transfer layer Material | Metallic layer Material | Thickness (mm) | strength (MPa) | Material | Thickness (mm) | modulus (GPa) | Compressive stress (MPa) | ∠AOC (°) | ∠BOC (°) | repro- ducibility |
| Ex. 28 | nickel | SUS304-CSP1/2H | 1.0 | 750 | silicon rubber | 6 | 207 | 0.62 | 2.1 | 2.1 | 57% |
| Comp. Ex. 3 | nickel | — | — | 600 | — | — | 207 | — | 0.2 | 0.2 | 100% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-094053 filed Apr. 17, 2012 and No. 2013-048993 filed Mar. 12, 2013, which are hereby incorporated by reference herein in their entirety.

What is claimed is:

1. A process for forming an uneven structure on a surface of a cylindrical electrophotographic photosensitive member containing a resin layer, the process including the following steps of:
   bringing a molding member having a surface structure corresponding to the uneven structure into pressure contact with the electrophotographic photosensitive member at a contacting face formed between the molding member and the cylindrical electrophotographic photosensitive member; and
   transferring the surface structure corresponding to the uneven structure on the surface of the molding member to the surface of the electrophotographic photosensitive member while rotating the electrophotographic photosensitive member,
   wherein, with respect to a cross-sectional perspective perpendicular to an axis of rotation, defined by a center O, of the electrophotographic photosensitive member, the following geometrical relationships occur:
   (a) contacting face is represented by an arc AB defined between a point A and a point B positioned about a circumferential surface of the cylindrical electrophotographic photosensitive member; and
   (b) a radial direction of the pressure contact of the molding member with the arc AB is represented by a point C, which is the point at which a radial line from the center O intersects arc AB which is circumferentially positioned between points A and point B about the arc AB,
   wherein the surface corresponding to the uneven structure on the surface of the molding member transfers to the surface of the electrophotographic photosensitive member so that angle ∠AOC and angle ∠BOC satisfy the following formulas (1) and (2), respectively:

$$0.5° \leq \angle AOC \leq 45°  \quad (1), \text{ and}$$

$$0.5° \leq \angle BOC \leq 45°  \quad (2), \text{ and}$$

wherein the molding member comprises:
   a transfer layer having the surface structure made of metal on a surface thereof;
   a metallic layer formed directly under the transfer layer; and
   an elastic layer formed directly under the metallic layer.

2. The process for processing a surface of an electrophotographic photosensitive member according to claim 1, wherein
   a Young's modulus of the surface of the molding member measured by an ultra-micro-hardness tester, is 69 MPa or more and 230 MPa or less, and
   a compressive stress of the surface of the molding member by compressive test in the direction of the pressure contact, is 0.42 MPa or more and 5.9 MPa or less.

3. The process for processing a surface of an electrophotographic photosensitive member according to claim 1, wherein
   a tension strength of a total of the transfer layer and the metallic layer, is 260 MPa or more and 1230 MPa or less, and
   a thickness of the total of the transfer layer and the metallic layer, is 0.1 mm or more and 5 mm or less.

4. The process for processing a surface of an electrophotographic photosensitive member according to claim 1, wherein the angle ∠AOC and the angle ∠BOC further satisfy the following formulas (3) and (4), respectively:

$$1° \leq \angle AOC \leq 15°  \quad (3), \text{ and}$$

$$1° \leq \angle BOC \leq 15°  \quad (4).$$

5. A process for producing an electrophotographic photosensitive member, which has an uneven structure on a surface thereof, comprising the steps of:
   producing an electrophotographic photosensitive member; and
   forming the uneven structure on the electrophotographic photosensitive member by the process according to claim 1.

6. The process for processing a surface of an electrophotographic photosensitive member according to claim 1, wherein the thickness of the elastic layer is 1.0 mm or more and 20 mm or less.

7. The process for processing a surface of an electrophotographic photosensitive member according to claim 1, wherein
   the pressurization force when bringing the molding member into pressure contact with the electrophotographic photosensitive member is 5 MPa or more and 200 MPa or less.

* * * * *